United States Patent
DiCintio et al.

(10) Patent No.: US 9,650,958 B2
(45) Date of Patent: May 16, 2017

(54) COMBUSTOR CAP WITH COOLING PASSAGE

(71) Applicant: General Electric Company, Schenectady, NY (US)

(72) Inventors: Richard Martin DiCintio, Simpsonville, SC (US); Patrick Benedict Melton, Horse Shoe, NC (US)

(73) Assignee: General Electric Company, Schenectady, NY (US)

(*) Notice: Subject to any disclaimer, the term of this patent is extended or adjusted under 35 U.S.C. 154(b) by 344 days.

(21) Appl. No.: 14/334,219

(22) Filed: Jul. 17, 2014

(65) Prior Publication Data

US 2016/0017805 A1  Jan. 21, 2016

(51) Int. Cl.
*F02C 7/16* (2006.01)
*F02C 7/264* (2006.01)

(52) U.S. Cl.
CPC ............... *F02C 7/16* (2013.01); *F02C 7/264* (2013.01)

(58) Field of Classification Search
CPC .. F02C 7/16; F02C 7/264; F23R 3/283; F23R 3/10; F23R 3/002; F23R 3/286
See application file for complete search history.

(56) References Cited

U.S. PATENT DOCUMENTS

| 6,446,438 B1* | 9/2002 | Kraft ................... F23R 3/005 60/737 |
| 6,923,002 B2 | 8/2005 | Crawley et al. |
| 7,954,326 B2 | 6/2011 | Lai et al. |
| 8,087,228 B2 | 1/2012 | McMahan et al. |
| 8,479,519 B2* | 7/2013 | Chen ................... F23D 14/78 60/740 |
| 8,495,881 B2 | 7/2013 | Edwards et al. |
| 9,175,857 B2* | 11/2015 | Melton ................ F23R 3/10 |
| 2002/0083711 A1* | 7/2002 | Dean .................. F23R 3/04 60/737 |
| 2009/0243230 A1* | 10/2009 | Myers ................ F23R 3/002 277/618 |
| 2010/0050640 A1* | 3/2010 | Belsom ................ F23R 3/10 60/734 |
| 2010/0058766 A1* | 3/2010 | McMahan ........... F23R 3/002 60/747 |
| 2010/0263384 A1* | 10/2010 | Chila .................. F23R 3/10 60/755 |
| 2011/0197586 A1* | 8/2011 | Berry ................. F23R 3/02 60/722 |
| 2012/0060511 A1* | 3/2012 | Zuo .................... F01D 25/12 60/806 |

(Continued)

OTHER PUBLICATIONS

Mola et al., "Additive Manufacturing: the roots of a revolution", GE Reports, Tech Talk, Mar. 2013.

*Primary Examiner* — Corey Skurdal
(74) *Attorney, Agent, or Firm* — Ernest G. Cusick; Hoffman Warnick LLC

(57) ABSTRACT

A combustor cap for a combustor chamber of a combustion system is provided. The combustor cap includes a plate member including: a plurality of openings for accommodating a plurality of fuel nozzles of the combustion system; a cooling passage extending through a plane of the plate member; an entrance opening to the cooling passage; and an exit opening from the cooling passage to a side of the plate member opposite to the combustion chamber.

26 Claims, 8 Drawing Sheets

(56) References Cited

U.S. PATENT DOCUMENTS

| | | | |
|---|---|---|---|
| 2012/0291440 A1* | 11/2012 | Moehrle | F23R 3/60 60/737 |
| 2012/0291451 A1* | 11/2012 | Moehrle | F23R 3/60 60/796 |
| 2012/0304655 A1* | 12/2012 | Rohrssen | F23R 3/002 60/752 |
| 2013/0074503 A1* | 3/2013 | Rohrssen | F23R 3/10 60/740 |
| 2013/0305725 A1* | 11/2013 | Berry | F23R 3/14 60/746 |
| 2013/0305739 A1* | 11/2013 | Berry | F23R 3/283 60/785 |
| 2014/0123658 A1* | 5/2014 | Kidder | F02C 3/14 60/772 |
| 2014/0202163 A1* | 7/2014 | Johnson | F02C 7/00 60/752 |
| 2015/0226435 A1* | 8/2015 | Melton | F23R 3/286 60/737 |
| 2015/0241064 A1* | 8/2015 | Boardman | F23R 3/283 60/737 |
| 2016/0054004 A1* | 2/2016 | Stoia | F02C 7/18 60/806 |
| 2016/0178202 A1* | 6/2016 | Antoniono | F23R 3/10 60/782 |
| 2016/0201916 A1* | 7/2016 | Allen | F23R 3/045 60/772 |

* cited by examiner

COMBUSTOR CAP WITH COOLING PASSAGE

BACKGROUND OF THE INVENTION

The disclosure relates generally to combustion systems, and more particularly, to a combustor cap with a cooling passage therein, a combustion system employing the combustor cap and an additive manufacturing file of the combustor cap.

Combustion systems such as used in a gas turbine engine include a number of fuel nozzles adjacent to a combustor chamber. A combustor cap is a plate-like member that includes a plurality of large holes to create a barrier between a nozzle area and/or position the fuel nozzles in a spaced relationship relative to the combustor chamber. Inside the combustor chamber, fuel from the fuel nozzles is mixed with air from the compressor and combusted in order to turn a turbine engine. Combustor caps are exposed to the combustion gases within the combustor chamber and thus experience the thermal conditions within the chamber. Conventionally, in order to cool the combustor cap, a large number of small effusion holes are provided in the plate allowing a cooling fluid to pass therethrough into the combustor chamber and cool the cap. This arrangement presents a number of challenges. First, the effusion holes in the cap may create stress risers within the cap due to the thermally induced stress. In other settings, a thermal barrier coating (TBC) may be applied to parts exposed to such heat to protect the parts from the thermally induced stresses. However, applying a TBC to a combustor cap including the smaller effusion holes is very hard and costly due to the need to not block the effusion holes. In addition, the effusion holes require the cooling fluid to enter the combustor chamber, which may negatively impact emissions of the combustion system.

BRIEF DESCRIPTION OF THE INVENTION

A first aspect of the disclosure provides a combustor cap for a combustor chamber of a combustion system, the combustor cap comprising: a plate member including: a plurality of openings for accommodating a plurality of fuel nozzles of the combustion system; a cooling passage extending through a plane of the plate member; an entrance opening to the cooling passage; and an exit opening from the cooling passage to a side of the plate member opposite to the combustion chamber.

A second aspect of the disclosure provides a combustion system comprising: a combustion casing; a flow sleeve within the casing and surrounding a combustor liner defining a combustion chamber; a plurality of fuel nozzles for providing a fuel-air mixture to the combustor liner; and a combustor cap for the combustor liner, the combustor cap including a plate member, the plate member including: a plurality of openings for accommodating the plurality of fuel nozzles, a cooling passage extending through a plane of the plate member, an entrance opening to the cooling passage, and an exit opening from the cooling passage to a side of the plate member opposite to the combustion chamber.

A third aspect of the disclosure provides a non-transitory computer readable storage medium storing code representative of a combustor cap for a combustion system, the combustor cap physically generated upon execution of the code by a computerized additive manufacturing system, the code comprising: code representing the combustor cap, the combustor cap including: a plate member including: a plurality of openings for accommodating a plurality of fuel nozzles of the combustion system; a cooling passage extending through a plane of the plate member; an entrance opening to the cooling passage; and an exit opening from the cooling passage to a side of the plate member opposite to the combustion chamber.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

The following description is directed to a combustor cap for a combustor liner of a combustion system. The combustor cap includes a plate member including a plurality of openings for accommodating a plurality of fuel nozzles of the combustion system, and a cooling passage extending through a plane of the plate member. The combustor cap will be described relative to a combustor liner for a gas turbine engine. It will be understood, however, that the combustor cap may have other applications other than a gas turbine engine. A combustion system including the combustor cap will also be described as will an additive manufacturing file usable to generate the combustor cap.

Figure 1:
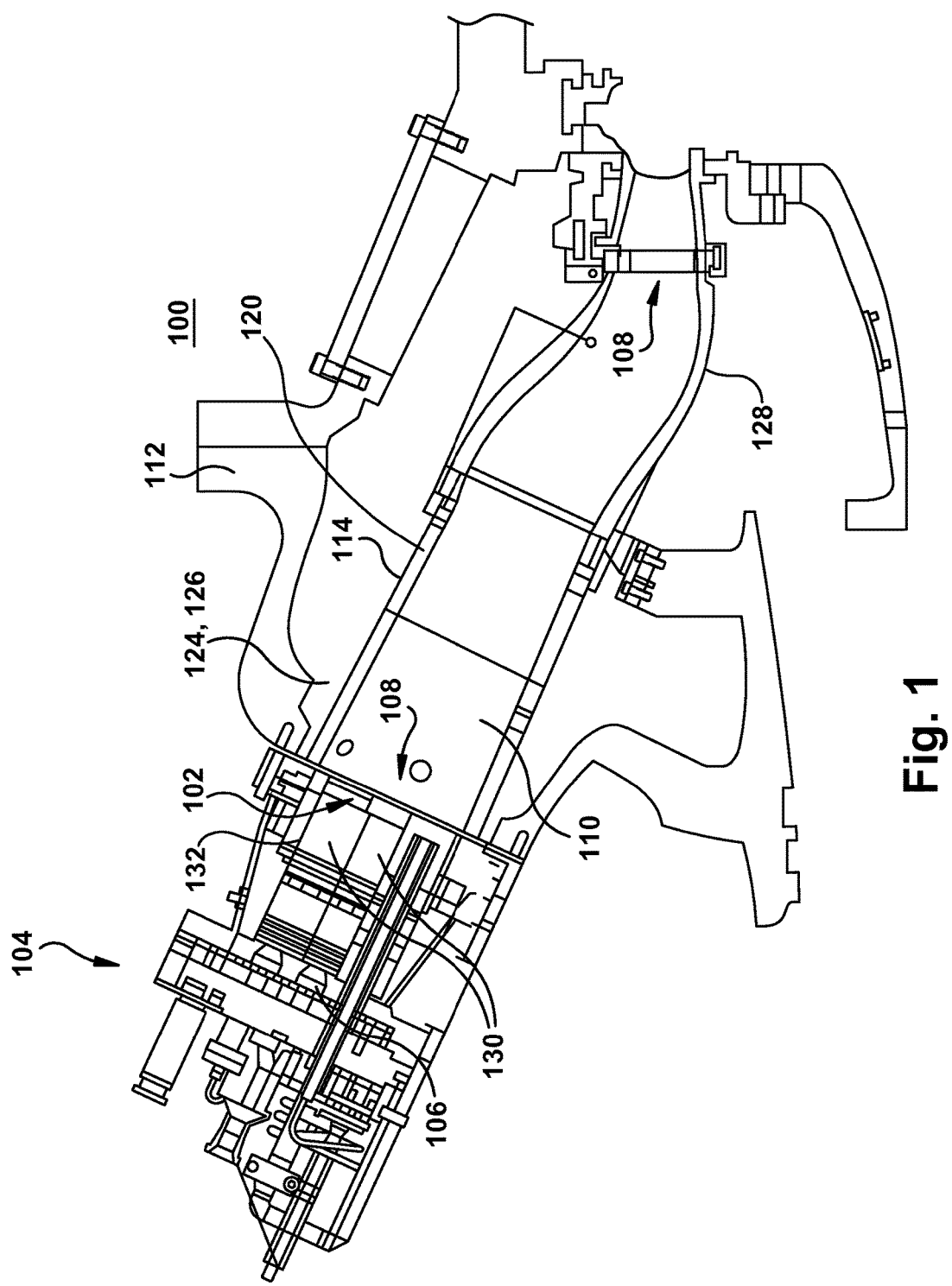
FIG. 1 shows a cross-sectional view of a combustion system employing a combustor cap including a cooling passage according to embodiments of the disclosure.

Now referring to the drawings, FIG. 1 is a schematic illustrating a combustion system 100 for a gas turbine. System 100 includes combustor cap 102 incorporated into a combustor assembly 104 of a gas turbine engine (not shown). Combustor cap 102 in accordance with exemplary embodiments of the disclosure can be incorporated into a combustor assembly 104 with varying configurations and should not be limited to the configuration shown in FIG. 1. Further details of combustion system 100 will be described herein.

Figure 2:
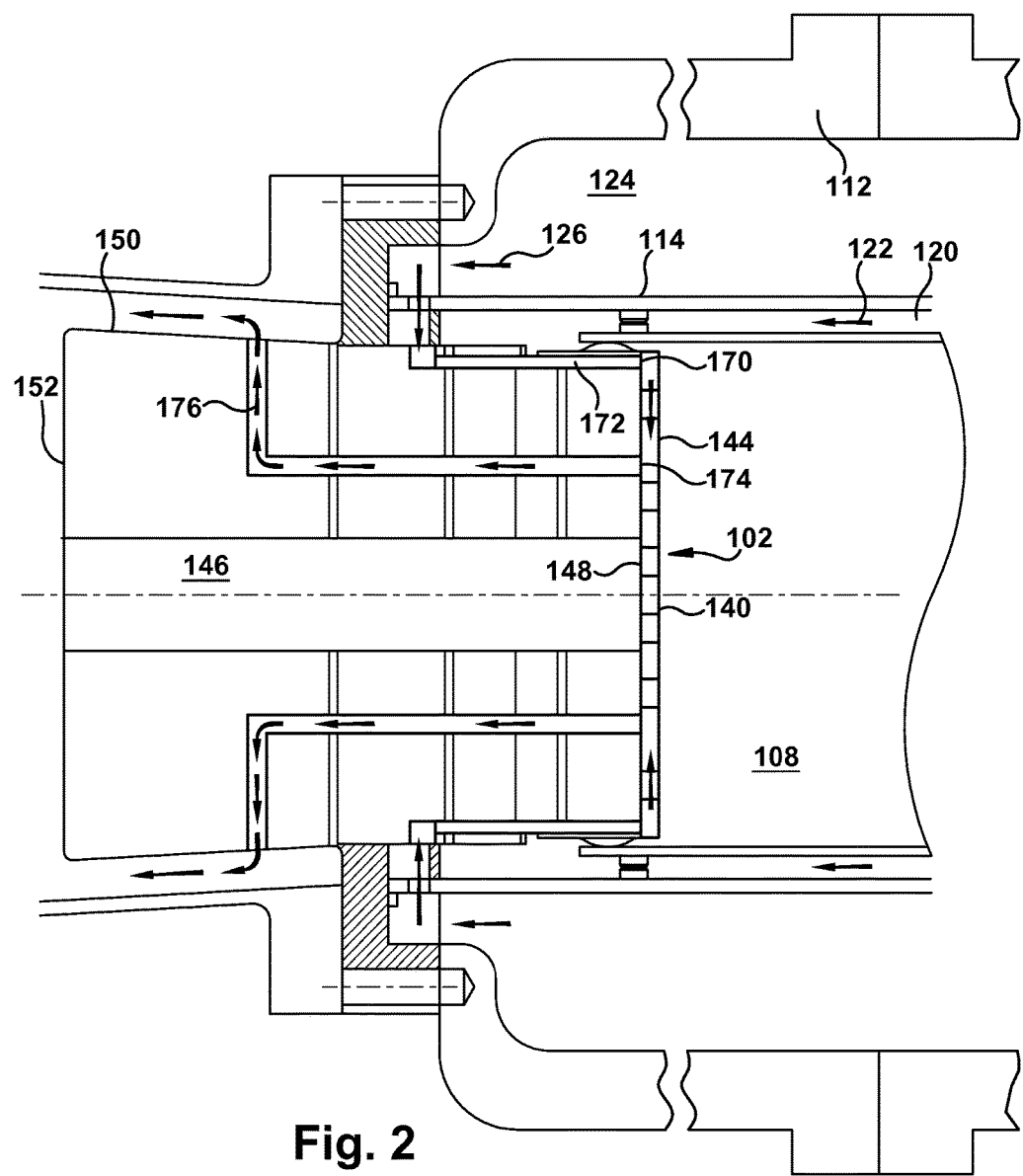
FIG. 2 shows an enlarged cross-sectional view of a combustor cap of the combustion system of FIG. 1 including a plate member including a cooling passage according to embodiments of the disclosure.

Referring to FIGS. 1 and 2, relevant portions of combustion system 100 including an example combustor assembly 104 are illustrated. FIG. 1 shows a cross-sectional view of the combustion system 100 and FIG. 2 shows a detailed cross-sectional view of combustor cap 102. Combustion system 100 may include a combustor chamber 108 defined, at least in part, by a combustor liner 110 disposed within a casing 112. A flow sleeve 114 may be mounted within casing 112 and surrounding combustor liner 110. Within combustor casing 112, flow sleeve 114 is spaced a distance outward from combustor liner 110. A space between flow sleeve 114 and combustor liner 110 forms a portion of a chamber 120 receiving a flow of cooling fluid 122 (FIG. 2) (e.g., air) from the compressor that enters through openings in the flow sleeve and transition piece impingement sleeve 128. In addition, a space between flow sleeve 114 and casing 112 forms a portion of a chamber 124 receiving a flow of cooling fluid 126 (FIG. 2)(e.g., air). Cooling fluids 126, 122 may include any now known or later developed fluid such as air. In one embodiment, cooling fluid 126 may be pressurized air from a compressor discharge (not shown), providing air at pressure $P_{ed}$. Cooling fluid 126 may be, for example, at a temperature in the range of approximately 370-430° C., while cooling fluid 122 may be, for example, at a temperature in the range of approximately 380-450° C. Cooling fluid 122 is typically warmer than cooling fluid 126. Combustion gases within combustor liner 110 may be, for example, at a temperature in the range of approximately 1480-1650° C.

As shown in FIGS. 1-2, a source of a fuel-air mixture 106 to combustor liner 110 is provided. Source 106 may include, among other things, a plurality of fuel nozzle(s) 130 (only two shown in FIG. 1) that inject liquid or gaseous fuel into combustor chamber 108 where it is burned with the air entering through chamber 124. Nozzles 130 may each include a fuel nozzle assembly (not shown for clarity) within a burner tube 132. Each burner tube 132 may be positioned within an opening 142 (FIGS. 3, 5 and 7) of combustor cap 102. An interior of each burner tube 132 is open to combustor chamber 108. A nozzle assembly (not shown for clarity) of each nozzle 130 may extend into burner tube 132 in a known fashion. A length of burner tubes 132 may be positioned within a combustor cap space 146 of combustor cap 102 adjoining combustor liner 110. In operation, fuel is fed into nozzles 130 and ignited within combustor liner 110, combustor chamber 108. A hot energetic exhaust flow of products of combustion, excess fuel and/or excess air move toward turbine blades (not shown) to produce the desired work in a known fashion.

Figure 3:
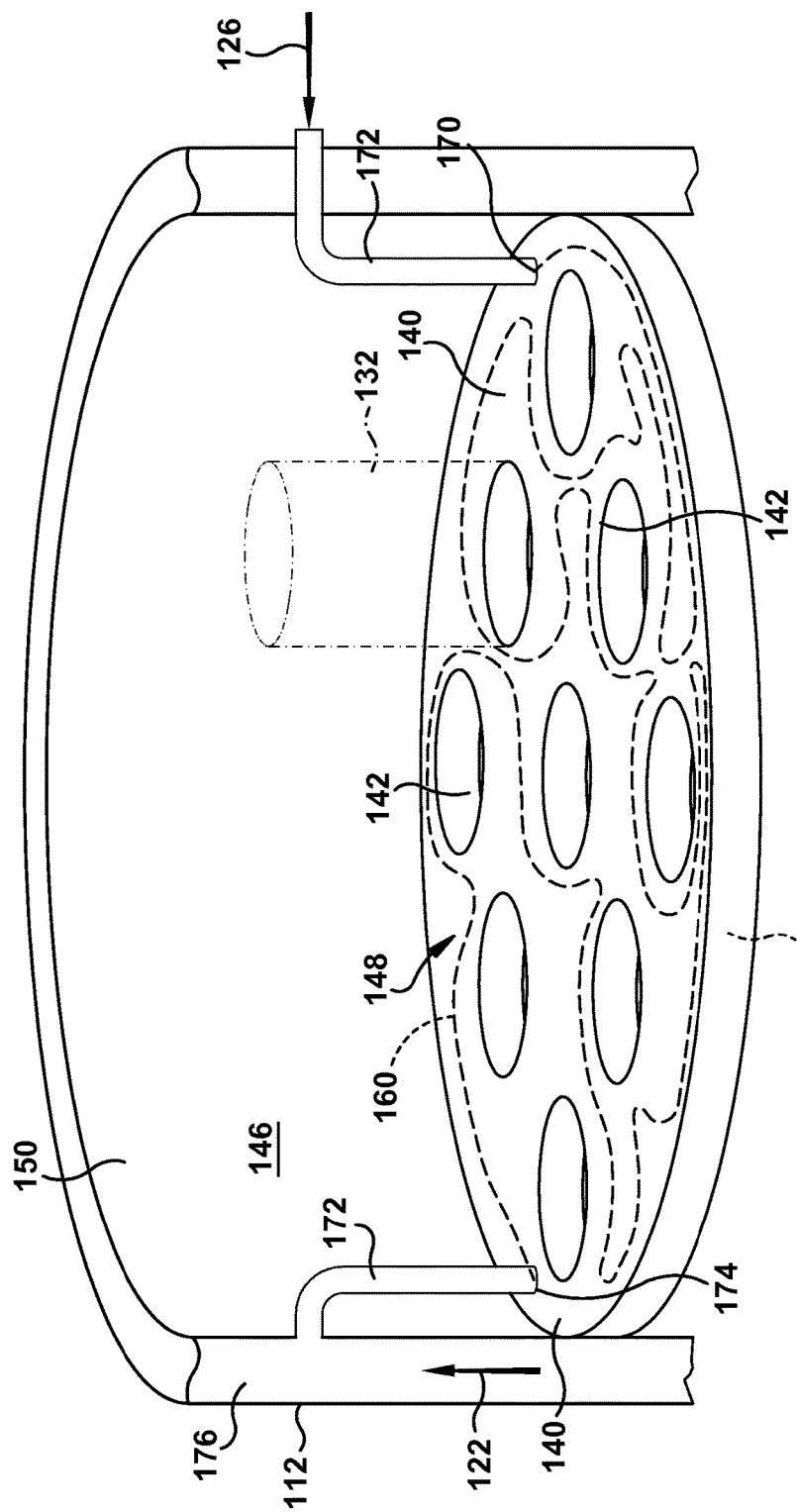
FIG. 3 shows a perspective view of the plate member of FIG. 2 including a cooling passage according to one embodiment of the disclosure.
Figure 4:
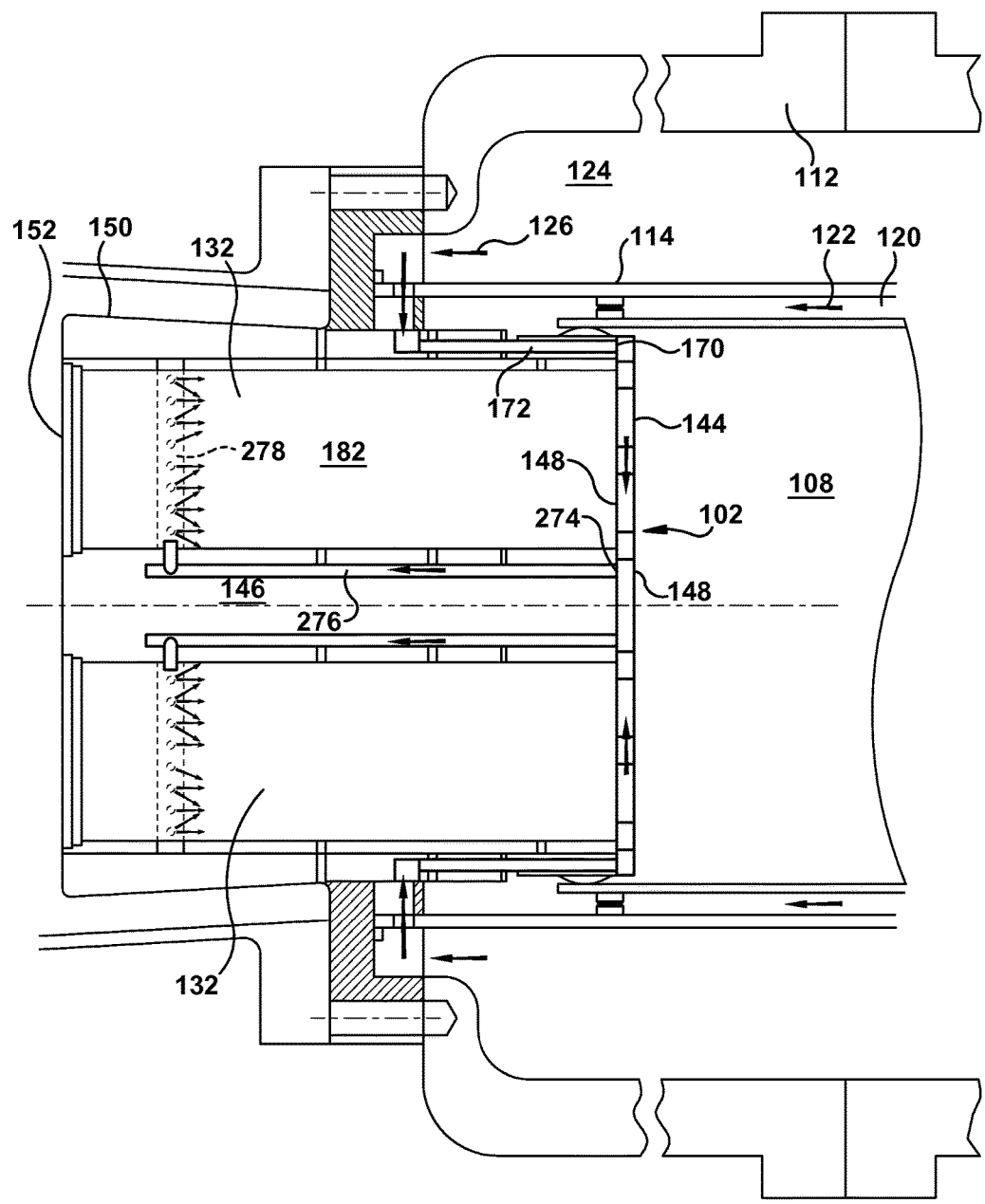
FIG. 4 shows an enlarged cross-sectional view of a combustor cap of the combustion system including a plate member including a cooling passage according to embodiments of the disclosure.
Figure 5:
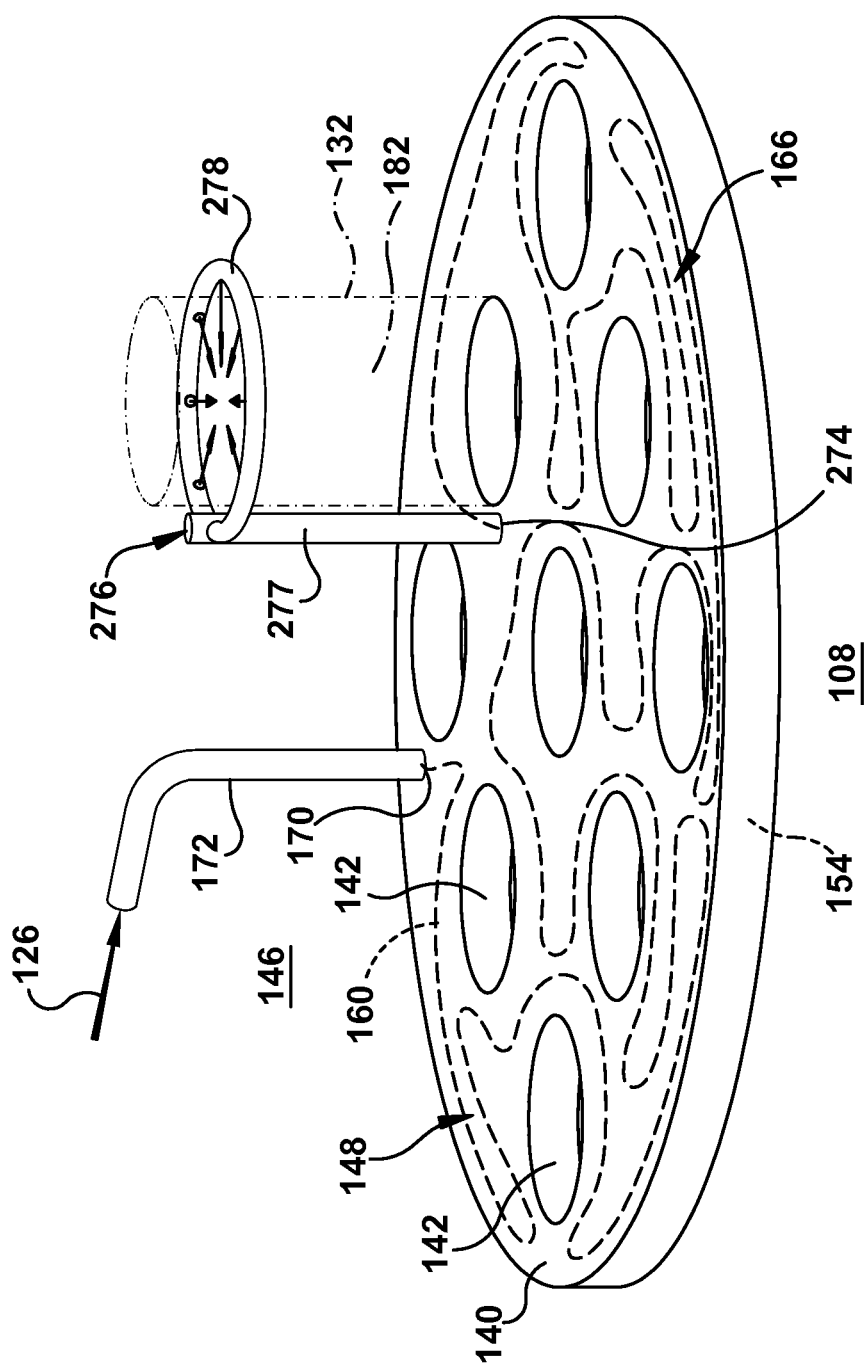
FIG. 5 shows a perspective view of the plate member of FIG. 4 including a cooling passage according to another embodiment of the disclosure.
Figure 6:
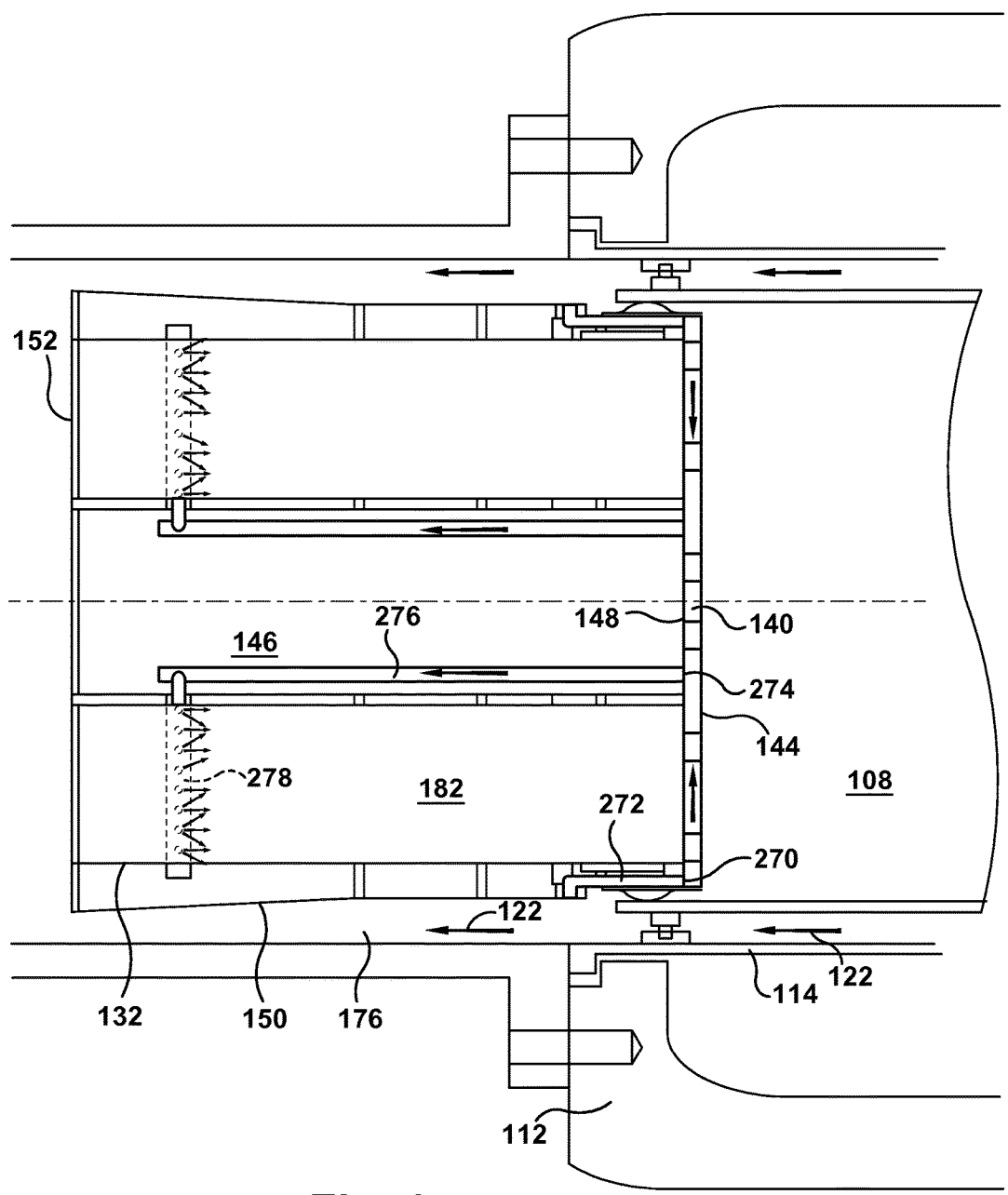
FIG. 6 shows an enlarged cross-sectional view of a combustor cap of the combustion system including a plate member including a cooling passage according to embodiments of the disclosure.
Figure 7:
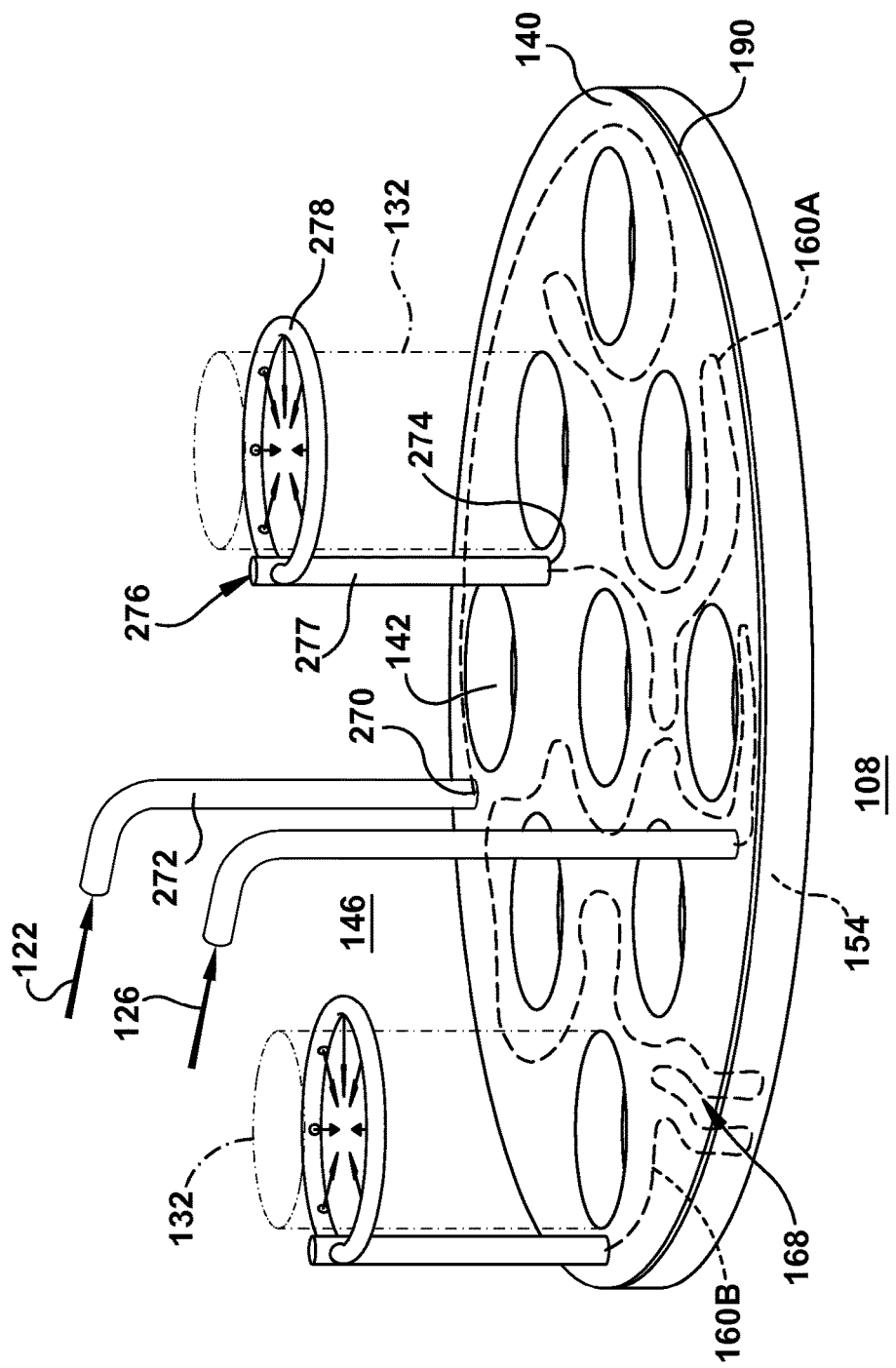
FIG. 7 shows a perspective view of the plate member of FIG. 6 including a cooling passage according to yet another embodiment of the disclosure.

Referring to FIGS. 2-7, details of combustor cap 102 for combustor liner 110 of combustion system 100 will now be described. FIGS. 2, 4 and 6 show detailed cross-sectional views of various embodiments of combustor cap 102, and FIGS. 3, 5 and 7 show perspective views of the various embodiments of combustor cap 102. (Note, respective cross-sections and perspective views do not necessarily match in terms of location of structure illustrated). Combustor cap 102 may include a plate member 140 including a plurality of openings 142 for accommodating a plurality of burner tubes 132 of the fuel nozzles (shown in phantom, only one shown in FIGS. 3, 5 and 6) of combustion system 100. In particular, openings 142 may be sized to accommodate burner tubes 132 of nozzles 130. As observed in FIGS. 2, 4 and 6, plate member 140 is exposed to combustor chamber 108 on a combustor-side face 144, and combustor cap space 146 surrounds burner tubes 132 on a back-side face 148. A nozzle shroud 150 may surround and define combustor cap space 146. Nozzle shroud 150 may be made of, for example, a sheet metal. Note, in FIGS. 2, 4 and 6, many of the burner tubes 132 have been omitted for clarity.

In contrast to conventional combustor caps, and as shown best in FIGS. 3, 5 and 7 in phantom, plate member 140 of combustor cap 102 also includes a cooling passage 160 extending through a plane of the plate member. That is, cooling passage 160 extends within plate 140 without escaping therefrom except at particular exit and entrance openings, described herein. Cooling passage 160 can also be referred to as embedded in plate member 140 as it is an integral part thereof because it may be, as will be described herein, generated simultaneously with plate member 140 using additive manufacturing. Each cooling passage 160 may have a diameter of approximately 0.80-1.2 millimeters, and plate member 140 may have a thickness in the range of approximately 2.4-3.6 millimeters (mm). Exit openings, as will be described, extend to a face 148 (combustor cap space 146 side) of plate member 140 opposite to combustion chamber 108. Plate member 140 may have any shape necessary to accommodate mounting adjacent to combustor liner 110. In the example shown, plate member 140 is substantially circular; however, other shapes may be possible. Each opening 142 is sized and shaped to accommodate a respective nozzle 130, e.g., a burner tube 132 thereof. In the example shown, each opening 142 is substantially circular to accommodate a substantially circular burner tube 132 (FIGS. 3, 5 and 7) of a nozzle; however, other shapes may be possible. As shown in FIGS. 2, 4 and 6, combustor cap 102 may also include a baffle plate member 152 opposing plate member 140 at an opposing end of combustor cap space 146.

Cooling passage 160 may take a variety of paths through plate member 140 to provide cooling to any necessary portion of combustor cap 102. However, in contrast to conventional caps, cooling passage 160 does not allow cooling fluid to enter combustor chamber 108 of combustion system 100. That is, there are no effusion holes that allow cooling fluid to pass directly into combustor chamber 108. Cooling passage 160 may extend through the plane of plate member 140 such that the passage does not exit opposing faces 144, 148 of plate member 140 other than at particular, limited number of entrance and exit openings, described herein. Again, exit openings from cooling passage 160 extend to a side (combustor cap space 146 side) of plate member 140 opposite to combustion chamber 108. As illustrated in FIGS. 3, 5 and 7, cooling passage 160 may extend through the plane of plate member 140 so as to pass between plurality of openings 142 for burner tubes 132, providing cooling to those spaces. Cooling passage 160 may also include special path portions that provide specific cooling for hotspots or other areas requiring unique thermal dissipation. For example, as shown in FIG. 5, at least a portion 166 of passage 160 that extends through the plane of the plate member may extend in a substantially serpentine manner. In other examples, the path may be: helical within plate member 140, circle around openings 142, extend sinusoidally within plate member 140, and/or extend to a particular hot spot of combustor cap 102 and terminate. Further, as shown in FIG. 7, cooling passage 160 may also include a portion 168 that extends axially between faces 144, 148 of plate member 140 but not out of faces 144, 148, e.g., toward or away from combustor chamber 108, for at least part of its length other than at exit and entrance openings.

With regard to cooling fluid entrance and exit to combustor cap 102, FIGS. 2-7 show various embodiments, parts of which may be interchanged between the embodiments.

In one embodiment, shown in FIGS. 2 and 3, combustor cap 102 includes an entrance opening 170 to cooling passage 160. In this case, entrance opening 170 is configured to be fluidly communicative to a feed passage 172 carrying a cooling fluid 126 from a compressor discharge of a compressor of the combustion system. Although a particular layout is illustrated in FIG. 2, feed passage 172 may be routed to any location capable of tapping into cooling fluid 126, e.g., via an intermediate passage or directly from chamber 124. FIG. 3 shows one embodiment of an exit opening 174 to cooling passage 160. In this case, exit opening 174 is configured to be fluidly communicative with an exit passage 172 in fluid communication with a chamber 176 between a combustion casing 112 and nozzle shroud 150 of the combustion system, which carries cooling fluid 122. As shown in FIG. 2, chamber 176 may be in fluid communication with chamber 120, although other routing possibilities for cooling fluid 122 may exist. As understood, cooling fluid 126 from a compressor discharge provides relatively high pressure compared to that of partially thermally loaded/used cooling fluid 122 from chamber 120 between flow sleeve 114 and combustor liner 110. Consequently, cooling fluid 126 entering entrance 170 has a high enough pressure to pass through cooling passage 160 and exit from exit opening 174 to join lower pressure cooling fluid 122. As cooling fluid 126 passes through cooling passage 160, it cools combustor cap 102, i.e., plate member 140, but does not exit into combustor chamber 108 (as in conventional effusion hole type combustor caps). The cooling fluid that exits from exit opening 174 can subsequently be used for further cooling and/or combustion.

Referring to FIGS. 4 and 5, in another embodiment, combustor cap 102 includes entrance opening 170 to cooling passage 160 as in the FIGS. 2-3 embodiment. That is, entrance opening 170 is configured to be fluidly communicative to a feed passage 172 carrying a cooling fluid 126 from a compressor discharge of a compressor of the combustion system. Again, although a particular layout is illustrated in FIG. 3, feed passage 172 may be routed to any location capable of tapping into cooling fluid 126, e.g., via an intermediate passage or directly from chamber 124. In contrast to FIG. 3, as shown in FIGS. 4-5, an exit opening 274 to cooling passage 160 is configured to be fluidly communicative with an exit passage 276 carrying the cooling fluid to a burner tube 132 of at least one of the plurality of nozzles 130 of the combustion system. As shown in best in FIG. 5, passage 276 from exit opening 274 may include a number of parts. For example, passage 276 may include a linear section 277 from exit opening 274 fluidly communicative with a ringed conduit 278 that delivers the cooling fluid 126 in a circumferentially, evenly distributed manner into burner tube 132. Burner tube 132 may include any necessary ports (not numbered) to allow cooling fluid 126 to enter therein. Although passage 276 has been described in a particular arrangement, any manner of delivering cooling fluid 126 from exit opening 274 for burner tube 132 may be employed, e.g., a direct, single passage into burner tube 132. As understood, cooling fluid 126 from a compressor discharge provides relatively high pressure compared to that of the combustion gases in combustor chamber 108, and hence, within burner tubes 132. Consequently, cooling fluid 126 entering entrance 170 has a high enough pressure to pass through cooling passage 160 and exit from exit opening 274 to join lower pressure combustion fluid 182, e.g., air, within burner tubes 132. As cooling fluid 126 passes through cooling passage 160, it cools combustor cap 102, i.e., plate member 140, but does not exit into combustor chamber 108. The cooling fluid that exits from exit opening 274 is subsequently used for combustion with combustion fluid 182 within burner tube 132 and combustor chamber 108.

Referring to FIGS. 6 and 7, in another embodiment, combustor cap 102 may include an entrance opening 270 to cooling passage 160. Here, entrance opening 270 is configured to be fluidly communicative with a feed passage 272 carrying cooling fluid 122 from a chamber 120 between flow sleeve 114 and combustor liner 110 of the combustion system. Feed passage 272 may fluidly couple directly to chamber 120 or a chamber fluidly communicative with a chamber such as chamber 176 between casing 112 and nozzle shroud 150. Here, as in the FIGS. 4-5 embodiment, exit opening 274 to cooling passage 160 is configured to be fluidly communicative with passage 276 carrying the cooling fluid to burner tube 132 of at least one of the plurality of nozzles 130 of the combustion system. Passage 276 may be substantially similar to that described relative to the FIGS. 4-5 embodiment. As understood, cooling fluid 122 from passage 120 (FIG. 6) provides relatively high pressure compared to that of combustion gases 182 in combustor chamber 108, and hence, within burner tubes 132. Consequently, cooling fluid 122 entering entrance 270 has a high enough pressure to pass through cooling passage 160 and exit from exit opening 274 to join lower pressure combustion fluid 182 within burner tubes 132. As described relative to FIGS. 4-5, passage 276 from exit opening may fluidly couple with ringed conduit 278 for delivering the cooling fluid 122 in a circumferentially, evenly distributed manner into burner tube 132. Burner tube 132 may include any necessary ports (not numbered) to allow cooling fluid 126 to enter therein. Again, although passages 276 and 278 have been described in a particular arrangement, any manner of delivering cooling fluid 126 from exit opening 274 for burner tube 132 may be employed.

FIG. 7 also illustrates how a number of cooling passages 160A, 160B each having their own exit and entrance openings may be employed within plate member 140. Any number of cooling passages may be employed. In another alternative, not shown, it may also be possible to provide a single entrance and numerous exits, provided sufficient cooling fluid pressure exists to do so. In this fashion, a cooling fluid may enter from a particular location and exit at more than one different location, providing cooling fluid to a variety of locations.

Although various embodiments have been described of entrance openings and exit openings to cooling passage 160, each entrance opening and exit opening is positioned in a back face 148 (combustor cap space 146 side) of plate member 140 within a nozzle shroud 150 of the combustion system. In this manner, no cooling fluid 126, 122 that enters cooling passage 160 directly enters combustor chamber 108 as in conventional effusion hole type combustor plates.

Any of the numerous feed passages, e.g., 172, 276, 278, etc., described herein may include any now known or later developed piping or conduits capable of manufacture of the necessary turns, connections, etc., and capable of withstanding the thermal environment of combustion system 100. In one example, feed passages may include stainless steel piping; however, other materials may also be applicable. In addition, any now known or later developed seals or connectors may be provided for the various passages to accommodate fluidly sealed coupling with plate member 140, passage through nozzle shroud 150 or other components, etc.

As described herein, embodiments of the disclosure allow for combustor cap 102 to be cooled without introducing a cooling fluid into combustor 108, thus improving emissions. That said, the used cooling fluid can be re-used for combustion with nozzles 130, or in other cooling passages. Cooling passage 160 may extend the life/durability of combustor cap 102 by reducing exposure to stress risers. In addition, since effusion holes are not provided on either face 144, 148 of plate member 140, a thermal barrier coating (TBC) 190 (FIG. 7 only) may be applied on plate member 140, resulting in any of a variety of improve thermal characteristics provided by TBCs such as but not limited to protection of plate member 140 from thermally induced stresses and improved longevity of parts. Combustor cap 102 can be manufactured such that it is substantially similar in outer shape and dimensions such that it is compatible with current combustion systems 100 and, therefore, can be used to replace current caps.

The above-described combustor cap 102 can be manufactured using any now known or later developed technologies, e.g., machining, casting, etc. In one embodiment, however, additive manufacturing is particularly suited. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of metal, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) and direct metal laser melting (DMLM). In the current setting, DMLM has been found advantageous.

Figure 8:
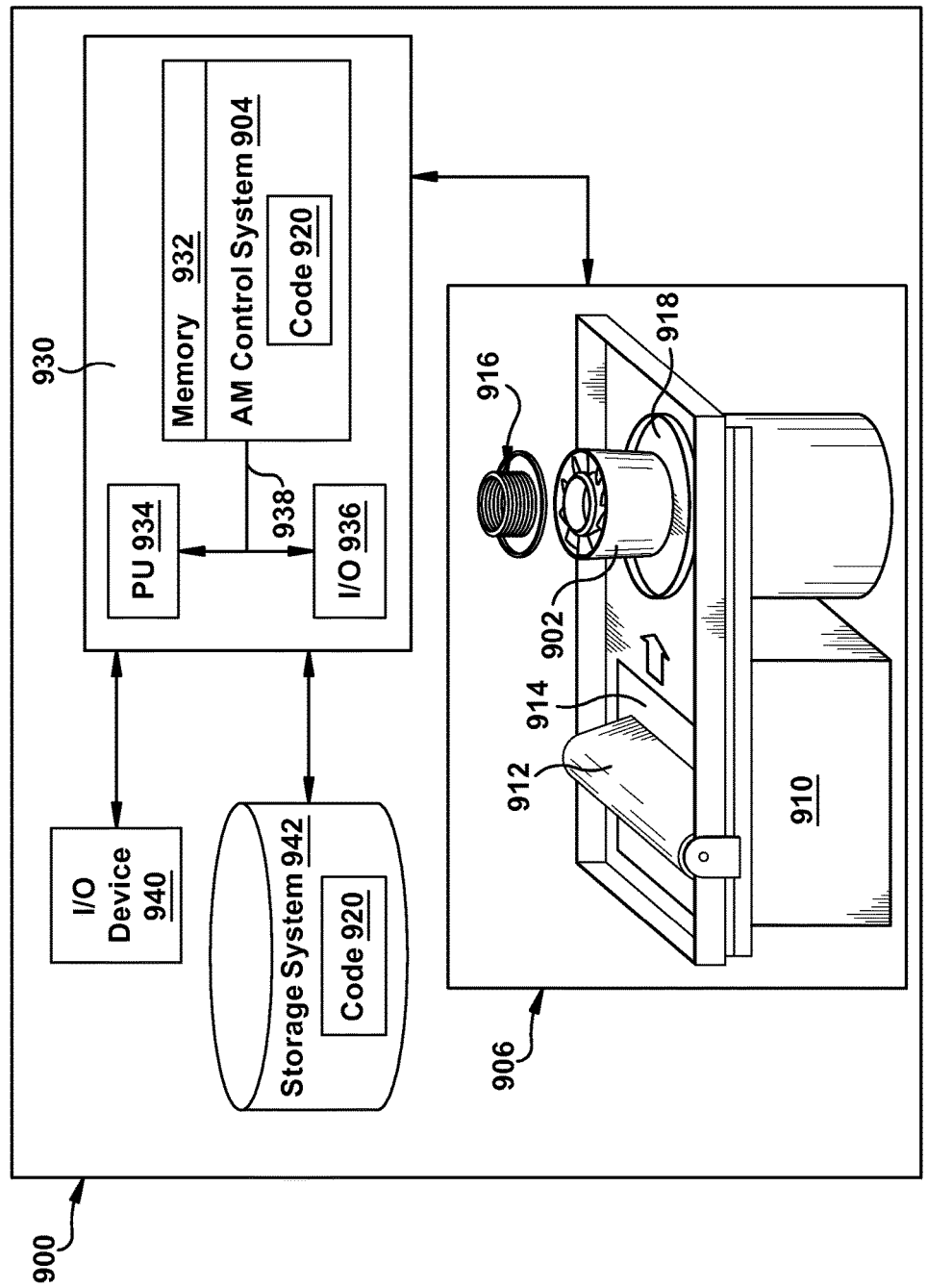
FIG. 8 shows a block diagram of an additive manufacturing process including a non-transitory computer readable storage medium storing code representative of an combustor cap according to embodiments of the disclosure.

To illustrate an example additive manufacturing process, FIG. 8 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture combustor cap 102 (FIGS. 1-7). AM system 900 generally includes a computerized additive manufacturing (AM) control system 904 and an AM printer 906. AM system 900, as will be described, executes code 920 that includes a set of computer-executable instructions defining combustor cap to physically generate the object using AM printer 906. Each AM process may use different raw materials in the form of, for example, fine-grain powder, liquid (e.g., polymers), sheet, etc., a stock of which may be held in a chamber 910 of AM printer 906. In the instant case, combustor cap 102 may be made of any conventional combustor cap material such as nickel based alloys, or other suitable materials for combustion system applications. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer. In the example shown, a laser or electron beam 916 fuses particles for each slice, as defined by code 920. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 932 is shown in communication with an external I/O device/resource 940 and a storage system 942. In general, processor 934 executes computer program code, such as AM control system 904, that is stored in memory 932 and/or storage system 942 under instructions from code 920 representative of combustor cap 102 (FIGS. 1-7), described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of combustor cap 102. As noted, code 920 includes a set of computer-executable instructions defining combustor cap that can be used to physically generate the tip, upon execution of the code by system 900. For example, code 920 may include a precisely defined 3D model of combustor cap and can be generated from any of a large variety of well known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereo-lithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing combustor cap 102 (FIGS. 1-7) into a series of thin slices that it assembles using AM printer 906 in successive layers of liquid, powder, sheet or other material. In the DMLM example, each layer is melted to the exact geometry defined by code 920 and fused to the preceding layer. Subsequently, the combustor cap may be exposed to any variety of finishing processes, e.g., minor machining, sealing, polishing, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A combustor cap for a combustor chamber of a combustion system, the combustor cap comprising:
    a plate member including:
        a plurality of openings for accommodating a plurality of fuel nozzles of the combustion system;
        a cooling passage extending through a plane of the plate member;
        an entrance opening to the cooling passage; and
        an exit opening from the cooling passage to a side of the plate member opposite to the combustion chamber.

2. The combustor cap of claim 1, wherein the entrance opening is configured to be fluidly communicative with a feed passage carrying a cooling fluid from a compressor discharge of a compressor of the combustion system.

3. The combustor cap of claim 2, wherein the exit opening is configured to be fluidly communicative with an exit passage carrying the cooling fluid to a chamber between a combustion casing and a nozzle shroud of the combustion system.

4. The combustor cap of claim 2, wherein the exit opening is configured to be fluidly communicative with an exit passage carrying the cooling fluid to a burner tube of at least one of the plurality of nozzles of the combustion system.

5. The combustor cap of claim 1, wherein the entrance opening is configured to be fluidly communicative with a feed passage carrying a cooling fluid from a chamber between a flow sleeve and a combustor liner of the combustion system.

6. The combustor cap of claim 5, wherein the exit opening is configured to be fluidly communicative with a passage carrying the cooling fluid to a burner tube of at least one of the plurality of nozzles of the combustion system.

7. The combustor cap of claim 1, wherein each of the entrance opening and the exit opening is positioned in a face of the plate member within a nozzle shroud of the combustion system.

8. The combustor cap of claim 1, wherein the cooling passage extends through the plane of the plate member so as to pass between the plurality of openings.

9. The combustor cap of claim 1, wherein the cooling passage includes at least a portion that extends through the plane of the plate member in a substantially serpentine manner.

10. The combustor cap of claim 1, wherein the cooling passage includes a plurality of cooling passages, each cooling passage including an entrance opening and an exit opening to the respective cooling passage.

11. The combustor cap of claim 1, further comprising a thermal barrier coating on the plate member.

12. A combustion system comprising:
    a combustion casing;
    a flow sleeve within the casing and surrounding a combustor liner defining a combustion chamber;
    a plurality of fuel nozzles for providing a fuel-air mixture to the combustor liner; and
    a combustor cap for the combustor liner, the combustor cap including a plate member, the plate member including:
        a plurality of openings for accommodating the plurality of fuel nozzles,
        a cooling passage extending through a plane of the plate member,
        an entrance opening to the cooling passage, and
        an exit opening from the cooling passage to a side of the plate member opposite to the combustion chamber.

13. The combustion system of claim 12, wherein the entrance opening is fluidly communicative with a feed passage carrying a cooling fluid from a compressor discharge of a compressor of the combustion system.

14. The combustion system of claim 13, wherein the exit opening is fluidly communicative with an exit passage carrying the cooling fluid to a chamber between a combustion casing and a nozzle shroud of the combustion system.

15. The combustion system of claim 13, wherein the exit opening is fluidly communicative with an exit passage carrying the cooling fluid to a burner tube of at least one of the plurality of nozzles of the combustion system.

16. The combustion system of claim 12, wherein the entrance opening is fluidly communicative with a feed passage carrying a cooling fluid from a chamber between the flow sleeve and the combustor liner of the combustion system.

17. The combustion system of claim 16, wherein the exit opening is fluidly communicative with an exit passage carrying the cooling fluid to a burner tube of at least one of the plurality of nozzles of the combustion system.

18. The combustion system of claim 12, wherein each of the entrance opening and the exit opening is positioned in a face of the plate member within a nozzle shroud of the combustion system.

19. The combustion system of claim 12, wherein the cooling passage extends through the plane of the plate member so as to pass between the plurality of openings.

20. The combustion system of claim 12, wherein the cooling passage includes at least a portion that extends through the plane of the plate member in a substantially serpentine manner.

21. The combustor system of claim 12, wherein the cooling passage includes a plurality of cooling passages, each cooling passage including an entrance opening and an exit opening to the respective cooling passage.

22. The combustion system of claim 12, further comprising a thermal barrier coating on the plate member.

23. A non-transitory computer readable storage medium storing code representative of a combustor cap for a combustion system, the combustor cap physically generated upon execution of the code by a computerized additive manufacturing system, the code comprising:
   code representing the combustor cap, the combustor cap including:
   a plate member including:
      a plurality of openings for accommodating a plurality of fuel nozzles of the combustion system;
      a cooling passage extending through a plane of the plate member;
      an entrance opening to the cooling passage; and
      an exit opening from the cooling passage to a side of the plate member opposite to the combustion chamber.

24. The storage medium of claim 23, wherein the cooling passage extends through the plane of the plate member so as to pass between the plurality of openings.

25. The storage medium of claim 23, wherein the cooling passage includes at least a portion that extends through the plane of the plate member in a substantially serpentine manner.

26. The storage medium of claim 23, wherein the cooling passage includes a plurality of cooling passages, each cooling passage including an entrance opening and an exit opening to the respective cooling passage.

* * * * *